United States Patent [19]

Cox, Jr. et al.

[11] Patent Number: 5,515,367
[45] Date of Patent: May 7, 1996

[54] METHOD AND SYSTEM FOR PLANNING AND INSTALLING COMMUNICATION NETWORKS

[75] Inventors: Louis A. Cox, Jr., Denver; Yuping Qiu, Louisville; George E. Tegan, Lakewood; Lu Lu, Boulder, all of Colo.

[73] Assignee: U S West Advanced Technologies, Inc., Boulder, Colo.

[21] Appl. No.: 130,350

[22] Filed: Oct. 1, 1993

Related U.S. Application Data

[63] Continuation-in-part of Ser. No. 944,515, Sep. 10, 1992, abandoned, which is a continuation-in-part of Ser. No. 520,676, May 8, 1990, abandoned.

[51] Int. Cl.[6] .............................. H04L 12/43; H04L 12/46
[52] U.S. Cl. ...................... 370/60.1; 370/85.14; 370/94.2
[58] Field of Search ................................. 370/13, 17, 60, 370/60.1, 94.1, 94.2, 85.13, 85.14, 85.15, 16.1

[56] References Cited

U.S. PATENT DOCUMENTS

| | | | |
|---|---|---|---|
| 4,744,026 | 5/1988 | Vanderbei | 364/402 |
| 4,744,028 | 5/1988 | Karmarkar | 364/402 |
| 5,270,919 | 12/1993 | Blake et al. | 370/60.1 |

*Primary Examiner*—Wellington Chin
*Attorney, Agent, or Firm*—Brooks & Kushman

[57] ABSTRACT

A method is disclosed for use in cooperation with a computer having memory in a Synchronous Optical Network (SONET) for generating an optimized transition plan for the placement of Self-Healing Rings (SHR) and the routing of point-to-point demand in accordance with projected customer demand over a selected multi-period time interval. By determining the number of nodes within a SONET, the demand therebetween over selected time interval as well as the discounted add-drop cost for a plurality of selected Add-Drop Multiplexers (ADMs), a set of logical rings as well as a set of physical rings and detailed routing information may be obtained and graphically illustrated. Logical rings may be determined by optimizing discounted fixed and interconnection costs for the plurality of ADMs in accordance with a selected mixed integer program to generate a corresponding electrical signal for receipt by the computer memory. Thereafter, the placement of physical self-healing rings, the cash flow out and optimal traffic routing may be determined in accordance with a second selected mixed integer program whereupon a second electrical signal may be generated corresponding thereto. Utilizing a heuristic approach, where the number of nodes under study is high, logical rings may be determined through an iterative process of randomly generating new proposed rings or, in the alternative, randomly expanding existing proposed rings until all demand has been satisfied.

11 Claims, 7 Drawing Sheets

—— Signal Path
TM - Terminal Multiplexer
ADM - Add/Drop Multiplexer

METHOD AND SYSTEM FOR PLANNING AND INSTALLING COMMUNICATION NETWORKS

CROSS-REFERENCE TO RELATED APPLICATION

This application is a continuation-in-part of U.S. patent application Ser. No. 07/944,515, filed Sep. 10, 1992, now abandoned which, in turn, is a continuation-in-part of U.S. patent application Ser. No. 07/520,676, filed May 8, 1990, now abandoned.

TECHNICAL FIELD

This invention relates generally to Synchronous Optical Networks (SONETs) and, more particularly, to a method and system for generating an optimized transition plan for the placement of Self-Healing Rings (SHR) and the routing of point-to-point demand within said SONETs in accordance with projected customer demand over selected time intervals in cooperation with a computer having sufficient memory capability.

BACKGROUND ART

Since the divestiture of the American Telephone & Telegraph Company in 1984, the Regional Bell Holding Companies (RBHCs) have focused their efforts on cutting operating costs, upgrading their networks, providing new high speed services, and interconnecting their networks to long-distance companies and international carriers. One of the tools the RBHCs have chosen to achieve these goals is the Synchronous Optical Network (SONET). SONET is both a standard and a set of specifications for building high speed, digital communications networks that run over fiberoptic cables while interfacing with existing electrical protocols and asynchronous transmission equipment. Fiberoptics has revolutionized telecommunications in view of the large bandwidth availability (currently estimated in the hundreds of gigabits per second) which continues to increase with technological advances such as wave-division multiplexing and similar developments in light polarization and dispersion-shifted fibers.

As those skilled in the art will recognize, SONET specifies a digital hierarchy based on Optical Carrier (OC) rather than electrical levels. SONET does define Synchronous Transport Signals (STS), however, which are electrical interfaces used as the multiplexing mechanisms within SONET Network Elements (NE). Network elements combine STS-1s as needed up to STS-N where N is the number of STS-1s, then convert the total electrical multiplex to an optical carrier and transmit it over optical fiber. SONET is multiplexed at the byte level, allowing services to be dynamically placed into the broadband STS for transport. The basic SONET of 64 Kbps per byte is the same speed as the conceptual voice channel DS0 allowing SONET to easily integrate all currently used digital services into the optical hierarchy.

One of the principal benefits of SONET is that it allows for the direct multiplexing of current network services, such as DS1, DS1C, DS2, and DS3 into the synchronous payload of STS-1. As those skilled in the art will recognize, the above rates, as in the case of most defined rates, were developed based on existing transmission systems. For example, the DS1 and DS2 signal rates (1.544 million bits per second and 6.312 million bits per second) are the transmission rates of the T1 and T2 wire pair carrier systems.

Initially, one multiplexer, called an M12, was used to combined four DS1 channels into a DS2, and a second multiplexer, called an M23, was used to combine seven DS2 channels into a DS3. Presently, most networks use a single multiplexer termed an M13, which combines twenty-eight DS1 channels into a DS3. Of course, one of the key attributes of these previous multiplexer designs is that they permit DS1 signals to be timed independently, i.e. asynchronous multiplexing. Bits can therefore be sent at different transmission rates because individual channels need not be synchronized to a common timing source.

The asynchronous DS3 multiplexing standard was implemented in the days when most networks utilized analog technology and the few digital systems in existence generated their own clocking systems. Significantly, the transmission specifications for DS1 signals specify that the bit rate is 1.544 million bits per second, plus or minus 75 bps. To compensate for this range, additional bits must therefore be "stuffed" into each DS1 signal before they are multiplexed to a higher rate. Again, as those skilled in the art will recognize, while bit stuffing supports independently clocked input signals, it also makes it nearly impossible to locate individual DS1 or DS0 channels within a DS3 bit stream. To extract a single channel, a DS3 signal would need to first be demultiplexed through M13 components into twenty-eight DS1s before the channels could be switched or rearranged. As a result, the process of adding or deleting channels is expensive.

In contrast to asynchronous multiplexing, the SONET standard defines a viable alternative which supports greater capacity and efficiency. In the SONET multiplexing format, the basic signal transmission rate—STS-1—operates at 51.84 million bits per second. AN STS-1 can carry 28 DS1 signals or one asynchronous DS3. STS-1 signals are then multiplexed to produce higher bit rates—STS-2, STS-3, etc. As referenced above, the other term used to define the SONET signal levels is optical carrier. The bit rates are the same in each case, so the bit rate of the STS-1 equals the bit rate of the OC-1. The only difference is the type of signal that is being referenced. For example, if the signal is in an electrical format, it is referred to as an STS. Similarly, if the signal is in an optical format— compatible with a fiber medium—it is referred to as an OC.

The SONET standards define an alternative to asynchronous DS3 multiplexing, which describes how to divided STS signals into lower speed increments, i.e. virtual tributaries. The major advantage of synchronous multiplexing is that when DS1 and other low-speed channels are multiplexed directly into the STS format, the lower speed channels can be identified and reconfigured for drop-and-insert. As a result, the drop-and-insert process can be done simpler with less expense of hardware then the back-to-back M13 multiplexers used in asynchronous multiplexing.

Because of the large bandwidth availability in fiber, and the growing volume of data traffic, disruptions from link and node failures due to cable cuts, for example, become increasingly serious. Network survivability has therefore become a major concern for SONET designers and has fueled interest in what is known in the art as "ring" architectures. Such architectures take advantage of the capability provided by synchronous multiplexing in SONET to eliminate the need to backhaul traffic to central hubs. Thus, at each switching office, the SONET transport node directly accesses the required time slots in the bit stream through the use of modified Add-Drop Multiplexers (ADM). The SONET ring topology permits the creation of highly survivable networks which are viewed in the communications industry as essential for obtaining business for critical data communications.

In most cases, the deployment of SONET rings results in cost savings since it is far less expensive for carriers to install a fiber ring then to deploy point-to-point links. Consider, for example, a rural route, where linking remote terminals to a central office in a point-to-point application would require six multiplexers—one at each site and at the Central Office (CO) for each route—and six fibers, two to each site. In a ring topology, all that is required is one multiplexer at the CO and two fibers that go through a multiplexer at each site for a total of four multiplexers and two fibers. Significantly, in the ring topology, working or service traffic is routed in one direction only. If that fiber fails, traffic is rerouted on a protection fiber to flow in the opposite direction. In this manner, working traffic bypasses the failure to get to its proper destination.

Against this background, it is readily seen that there is significant debate in the communications industry regarding the type and location of rings, and in particular, Self-Healing Rings (SHR) to deploy. As those skilled in the art will recognize, the directionality of service routing and the protection mechanism are key attributes that distinguish different self-healing ring architectures. For example, a unidirectional ring routes service traffic in only one direction of the ring. On the other hand, a bidirectional ring routes the components of a duplex circuit in opposite directions on the ring. Similarly, in a path-switched ring, traffic is protected on a per path basis, and the switching is based on the health of each individual path where it exits the ring. Still further, in a line-switched ring, switching is based on the health of the line between each pair of nodes. Thus, when a line is faulty, the entire line is switched off to a protection loop at the failure's boundaries.

Based on the foregoing, two architectures have gained prominence for deployment in SONET networks. These are the two-fiber unidirectional path-switched rings (alternately termed path-switched rings), and two and four fiber bidirectional line-switched rings (alternately termed bidirectional rings).

Because of the importance of the proper design and implementation of self-healing rings, network designers are generally required to spend hundreds of hours in designing such networks in order to achieve the most cost-effective solution based upon projected demand. General methods and systems for allocating resources in telecommunication facilities are known generally in the art. As disclosed, for example, by U.S. Pat. No. 4,744,028 to Karmarkar. This patent discloses a method and system for allocating available telecommunication transmission facilities among subscribers demanding service at a particular time. An objective of the method and system is to reduce the total operation cost of the transmission facilities.

In the method and system disclosed by Karmarkar, subscribers and total cost are linearly related. The method and system tentatively and iteratively assign telecommunication transmission facilities to customers, determining each reassignment by normalizing a previous assignment in view of allocation constraints. These reiterative steps are terminated when the cost is found to be less than a threshold value, and an allocation and transmission facilities is made accordingly.

A similar method is disclosed in U.S. Pat. No. 4,744,026 to Vanderbei. This patent discloses a method for allocating available industrial facilities among users thereof and has an objective of reducing the total costs for providing the facilities. In the disclosed method, available facilities are tentatively and iteratively assigned to users according to an algorithm to reduce costs.

As in the case of Karmarkar, the method disclosed in Vanderbei requires that each reassignment be determined by normalizing a previous assignment in view of allocation constraints. During each reassignment, changes with respect to a previous assignment are adjusted, in terms of their direction, under the assumption that at least one constraint increases in value without limit. The reiterative steps are terminated when the cost if found to be less than a threshold value, and an allocation of transmission facilities is made according to the final, reduced-cost assignment.

While each of the above disclosed methods for allocating communication resources functions with a certain degree of efficiency, none disclose the advantages of the improved method and system for designing and implementing self-healing rings of the present invention as is hereinafter more fully described.

DISCLOSURE OF THE INVENTION

An object of the present invention is to provide a method and system for planning and installing communication network topologies including a sequence of network configurations that is responsive, at near-lowest cost, to projected customer demand over a plurality of specific periods.

Another object of the present invention is to provide a method and system for furnishing near-lowest cost communication network topologies reasonably quickly to enable efficient planning for a number of areas during a number of periods.

Yet another object of the present invention is to provide a method and system for planning, implementing and augmenting circuits and synchronous optical ring networks to match growing customer demand and component availability, at near-lowest cost, during specific periods.

Still another object of the present invention is to provide a method and system for efficiently routing point-to-point traffic through the synchronous optical ring network.

Another object of the present invention is to provide a method and system for producing both logical and physical ring designs, the former specifying the sets of nodes to be assigned to each ring and the latter specifying how fibers are to be assigned to realize the logical design.

Still another object of the present invention is to provide an optimized routing plan for distributing point-to-point traffic through the synchronous optical ring network and graphically displaying the same in a user friendly interface.

In realizing the aforementioned and other objects, the method and system of the present invention utilizes selected mixed-integer programs to efficiently model the information obtained during the iterative steps of the present invention in cooperation with a computer having sufficient memory. Such steps include the determination of nodes within the SONET under review, identification of the number of periods within the selected time interval, the determination of demand between nodes over this time period, preferably in units of DS3, and the determination of discounted add-drop costs for a plurality of selected Add/Drop Multiplexers (ADM's) and related components based upon projected availability. If the number of nodes under review is small, once this information is determined, then the optimized discounted fixed and interconnection costs for this plurality of ADM's may be determined in accordance with a first selected mixed integer program. An electrical signal may thereafter be generated for receipt by said computer memory corresponding to a set of logical self-healing rings with preliminary, albeit detailed, routing information. In contrast, when the number of nodes under review is large, a heuristic approach is required.

In the heuristic approach, the user is required to load traffic to existing rings by repetitively identifying the smallest point-to-point demand between nodes on existing rings and assigning this demand to the rings until no demand left may be routed. Thereafter, a proposed ring is created by identifying the greatest unsatisfied point-to-point demand between two adjacent nodes and assigning the nodes to the ring. At this point, new proposed rings may either be randomly generated until all demand has been satisfied or, in the alternative, existing rings may be expanded. If the latter step is selected, expansion is carried out by repetitively calculating the largest unsatisfied demand of neighbor nodes for each of the proposed rings and identifying a plurality of neighbor nodes having the greatest unsatisfied demand. At that point, a determination may be made regarding the deficit of each of the proposed rings as well as the identification of a plurality of proposed rings with the greatest deficit.

Finally, one of the rings with the greatest deficit may be assigned to one of the neighbor nodes and inter-ring traffic may be loaded until all demand has been routed. Traffic is loaded through a process of repetitively identifying demand that can be routed the greatest distance through the smallest number of proposed rings and assigning that demand accordingly. At this point, an electrical signal is summarily generated also for receipt by said computer memory and corresponding to a set of logical self-healing rings with preliminary routing information.

Once logical rings have been determined, whether in accordance with a mixed integer program or through repetitive iterations such as in the heuristic approach, the placement of physical self-healing rings and optimal traffic routing may thereafter be determined by retrieving the logical SHR and preliminary routing information from memory and maximizing the percentage of demand covered and minimizing the total inter-ring traffic cost. This is accomplished through modeling the same in accordance with yet another mixed integer program and generating a corresponding electrical signal for receipt by said computer memory.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODES FOR CARRYING OUT THE INVENTION

Figure 1:
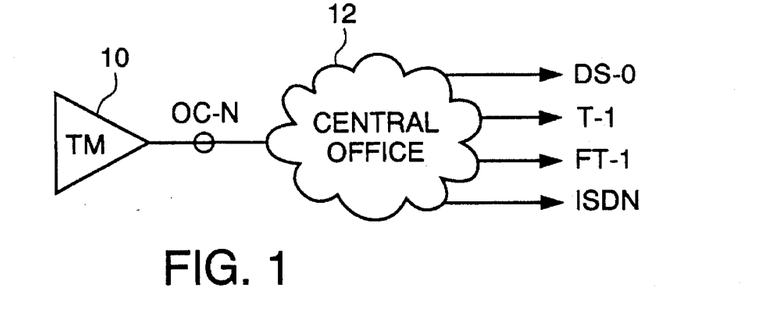
FIG. 1 is a schematic illustration of an entry level SONET multiplexer incorporated in a point-to-point link to a central office equipped with a terminating SONET port.

With reference to FIG. 1 of the drawings, there is shown for background purposes an entry level SONET multiplexer, i.e. a Terminal Multiplexer (TM) 10 which is designed to act as a concentrator of DSls as well as SONET virtual tributaries. TM 10 is shown in optical communication with a central office 12. As those skilled in the art will recognize, this entry level SONET multiplexer is capable of serving as a DS1 cross-connect and can similarly be managed by messages contained in the SONET's Embedded Overhead Channel (EOC).

Figure 2:
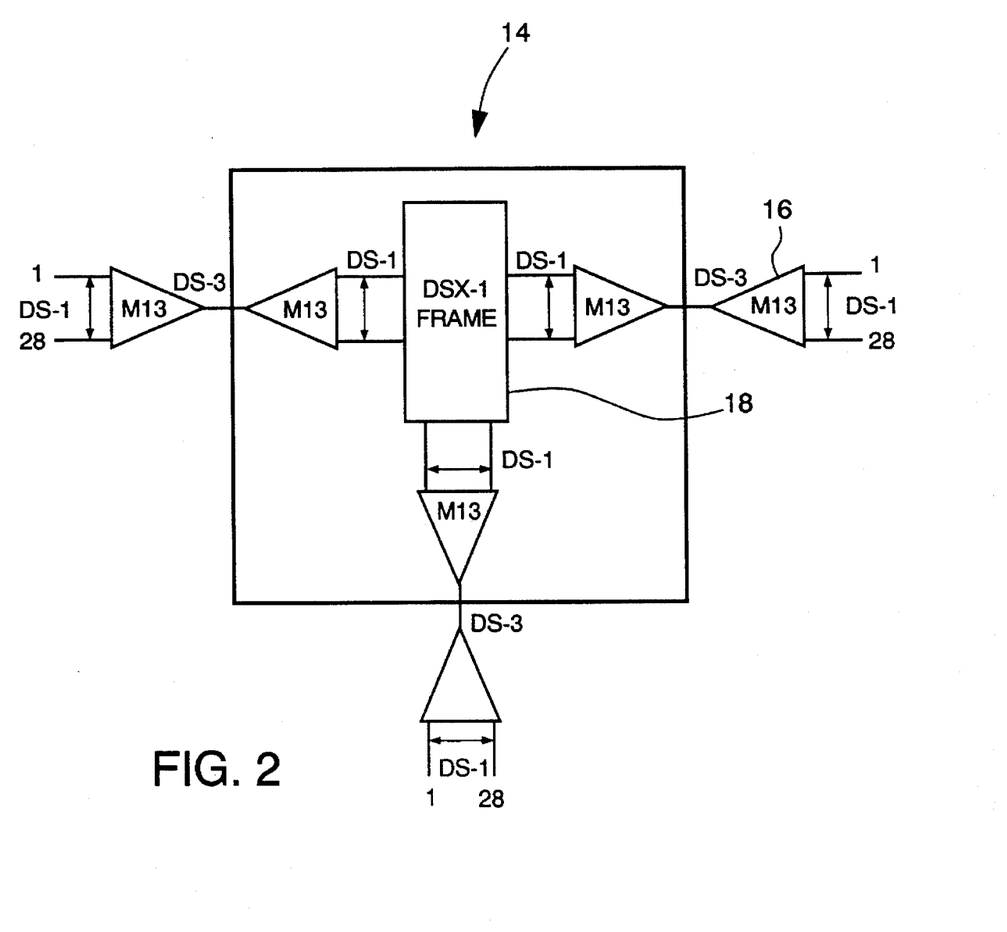
FIG. 2 is a schematic illustration of a common point-to-multipoint asynchronous network topology including a manual cross-connect for DS1 drop/insert.

Referring now to FIG. 2, there is illustrated further a typical asynchronous network topology generally referred to by reference numeral 14 wherein M13 multiplexers 16 are used to implement point-to-multipoint connections. As shown, to add or drop circuits at an intermediate site, the DS3 signal is demultiplexed back to its constituent DS1s. The DSX-1 frame 18 is used to manually cross-connect the DS1s, passing some on and dropping others off.

Figure 3:
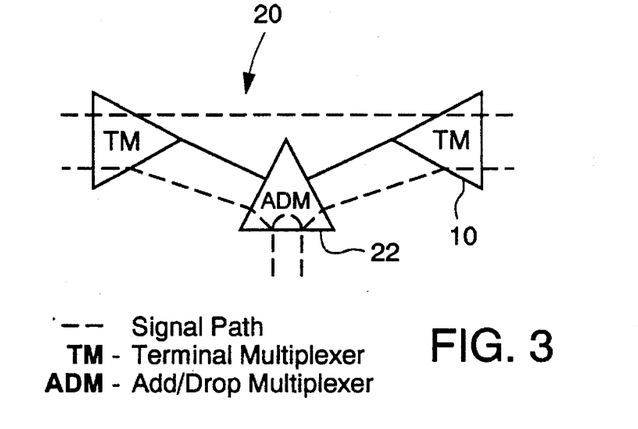
FIG. 3 is a schematic illustration of a linear point-to-multipoint network topology using a SONET Add-Drop Multiplexer (ADM)

Turning now to FIG. 3, there is shown a typical point-to-multipoint topology 20 utilizing a SONET Add/Drop Multiplexer (ADM) 22 interposed between two Terminal Multiplexers (TMs) 10. As readily seen, the ADM network element replaces M13s and the DSX-1 frame with an electronically configurable cross-connect. This design avoids the inefficiencies inherent in the above-referenced asynchronous topology.

Figure 4:
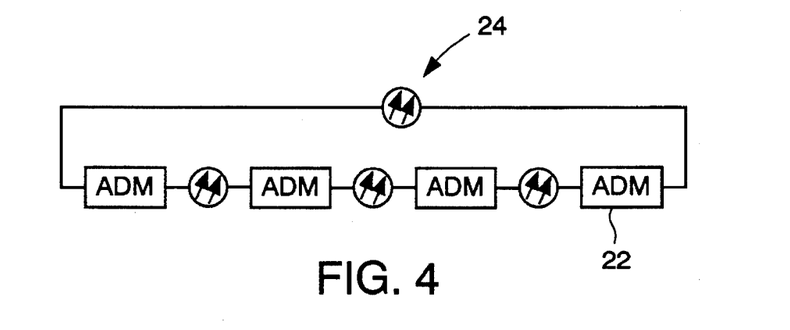
FIG. 4 is a schematic illustration of the linear point-to-multipoint topology of FIG. 3 viewed as an add/drop chain folded back on itself.
Figure 5:
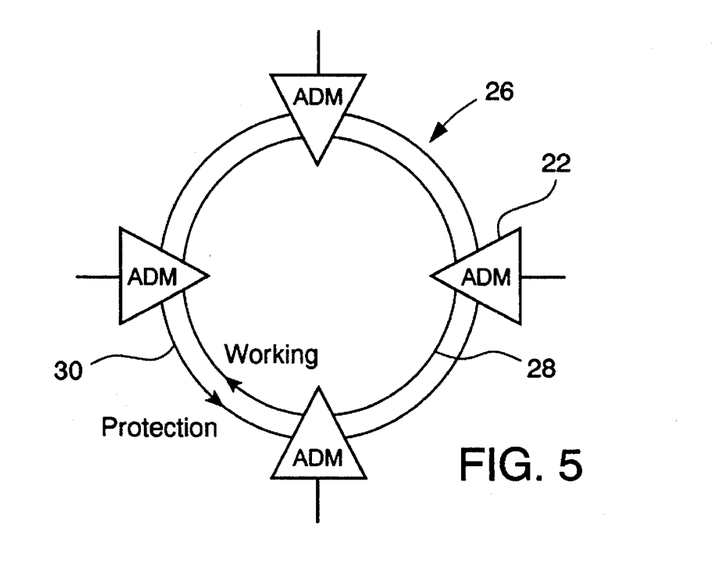
FIG. 5 is a representative SONET ring topology incorporating modified AMs.

Turning now to FIG. 4 of the drawings, there is shown a linear add/drop ring network 24 which may be viewed as an add/drop chain folded back on itself. This ring network includes a plurality of ADMs 22 electrically or optically connected in a simplified ring architecture. A more representative schematic of such a ring topology is further seen in FIG. 5 wherein a plurality of modified ADMs 22 are shown in electrical or optical communication through a SONET ring 26. The term modified is used because linear ADMs cannot be connected in a ring because of known operational restraints. As seen, this basic ring topology permits the creation of highly survivable networks utilizing Self-Healing Rings (SHRs). In operation, traffic normally is routed in one direction on the service fiber 28. If the fiber fails, however, traffic is rerouted to flow in the opposite direction on protection fiber 30. In this manner, working traffic bypasses the failure to get to its proper destination.

Figure 6:
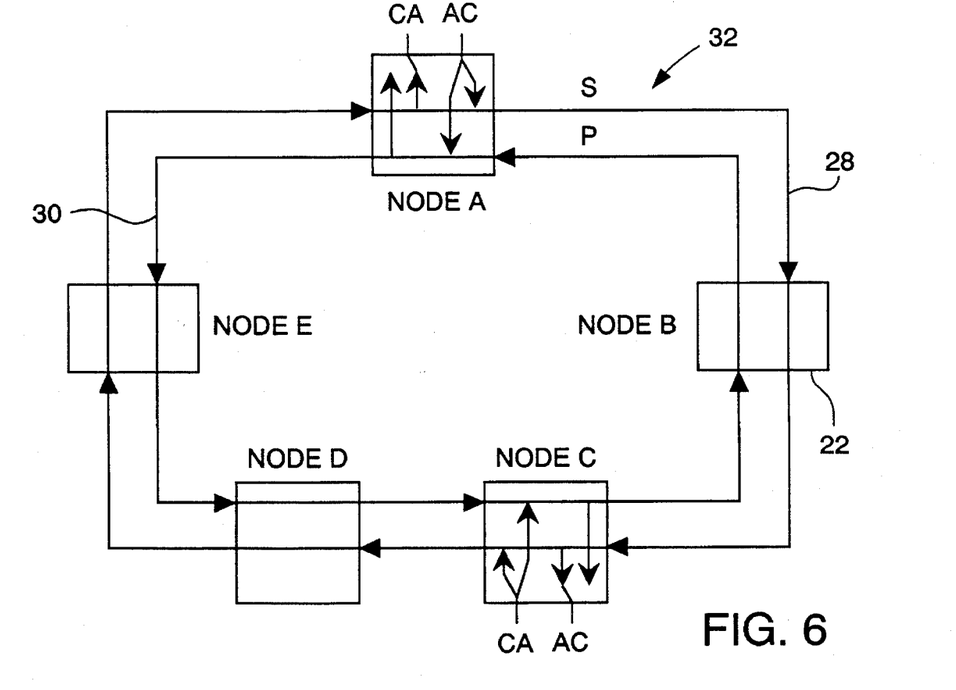
FIG. 6 is a schematic illustration of a two-fiber unidirectional path-switched ring.
Figure 7:
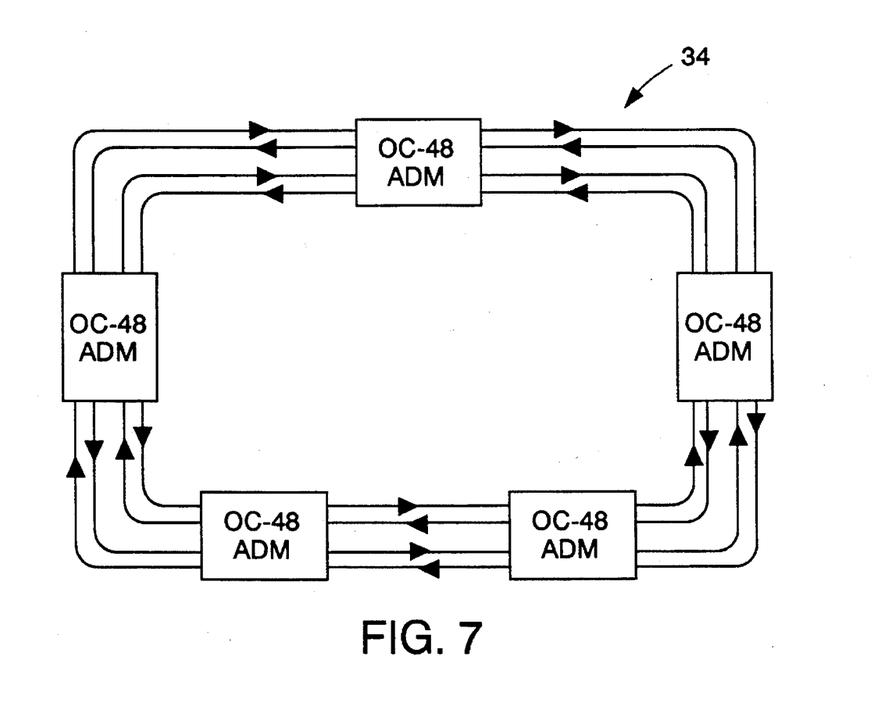
FIG. 7 is a schematic illustration of a four-fiber bidirectional ring.

More complex Self-Healing Rings are illustrated further in FIGS. 6–7 which are known to those skilled in the art to represent a two-fiber unidirectional path switched ring and four-fiber bidirectional ring, respectively. As shown in FIG. 6, two-fiber unidirectional path switched ring 32 includes a plurality of modified ADMs 22 provided in optical communication. The basic routing mechanism on the path switched ring of FIG. 6 is unidirectional in that transmission from node A to node C, for example, is clockwise on the service fiber 28. This signal is similarly dual-fed onto the protection fiber 30 such that there is a duplicate signal that flows counterclockwise from A to C and then back again from C to A. Each path is individually switched at the receive end based on SONET path layer signal health criteria. In the case of a cable cut affecting the traffic flowing on the service fiber, each individual path normally traversing the cut line is switched at its terminating node to the signal appearing off the protection fiber 30. As a result, traffic from node A to C, which normally would have flowed through the failed span, will be switched to the protection fiber. Traffic flowing from node C to node A will still flow on the service fiber 28, temporarily routing the traffic bidirectionally between the two nodes.

As those skilled in the art will recognize, each node on the unidirectional path switched ring of FIG. 6 provides add/drop functionality. Unlike the linear add/drop network of FIG. 5, the path-switched ring does not require directional provisioning, since each circuit on the ring is carried all the way around the ring in both directions, and it is only necessary to determine where it enters and leaves the ring.

Turning now to the four-fiber bidirectional ring 34 of FIG. 7, it is readily seen that this ring appears nearly indistinguishable from and acts substantially identical to an ordinary add/drop chain folded back on itself with one exception. That exception is that in the case of a complete fiber cut or node failure, the four-fiber bidirectional ring has ring Self-Healing capability and the add/drop chain does not. As seen, the four-fiber bidirectional ring has service and protectional, bidirectional fiber pairs on every strand similar to a linear add/drop chain. Thus, the get from node A to node Z, movement in the clockwise direction, the circuit must be provisioned by directionally as in an "add" at node A, a "through end" at intermediate nodes, and a "drop" at node Z. Significantly, traffic is routed only part way around the ring, thus provides the directional rings has a property of service channel reuse which provides a capacity advantage over of a path-switched ring, where service capacity must be dedicated entire ring.

Against this background, the method and system of the present invention is directed to generating an optimized transition plan for the placement of self-healing rings, and in particular two and four fiber bidirectional rings, within a synchronous optical network as well as the routing of point-to-point demand in accordance with projected customer demand. Communication services providers located in geographic areas that are experiencing growth in such demand are faced with this problem on a daily basis of planning for periodic expansion of communication services in the most economical and responsive manner. The expansion plan must be a function of factors including: (1) defined geographical area to be provided with communication services (2), locations within the area of switching offices to be included in a communication network, (3) a defined period or periods for which the plan is to be devised, (4) the nature of possible additions (5), tariff, user, operating and capital expense data and (6) customer demand and component availability projections.

Using the method steps described herein, and given the point-to-multipoint demand to be covered by proposed self-healing rings, the network planner may generate a cost-effective, multi-period transition plan for fiber-hubbed networks using SHR architecture in cooperation with a computer having sufficient memory. The method and system of the present invention provides detailed and multi-year planning information regarding the placement and expansion of SHRs including the optimized time, type and manner of interconnection. This information is tied to specific components and their present and future availability. The method consists of three major iterations: logical ring design, i.e., the proposed placement of ADMs, physical ring design, i.e., the proposed placement of fiber loops, and optimal traffic routing. The logical ring design iteration determines the set of central offices where modified ADMs should be placed to form a SONET ring. Similarly, the physical ring design then assigns physical fiber links to connect the offices in the logical ring, which may include the placement of fiber links through switching offices that are not apportioned an ADM. Finally, the optimal traffic routing iteration decides how the point-to-point demand should best be routed among the established rings.

Significantly, the present invention is directed to two optimizing approaches: (1) a simplified approach for use in a limited geographical area having a small number of nodes and thus a small number of available options for the design and implementation of self-healing rings, and (2) a heuristic approach for use in larger network areas containing many nodes and thus many possible ring implementations.

Against this background, it is thus readily seen that one of the initial steps in implementing the method of the present invention is to determine the number of nodes within the SONET for which traffic is required to be routed. As used herein, the term "traffic" is synonymous with "demand" which is directly related to the proposed number of telephone customers expected to subscribe to the network over a defined time period. Traffic is thus stated in terms of equivalent conceptual voice-grade circuits, and voice-grade circuits representing a unit of demand. Demand is directly related to the number of telephone customers expected to subscribe to the service. Using conversion factors based upon estimates of call frequency and duration, the network flow resulting from the demand may be estimated in hundreds of call-seconds per hour; and this measure may be then converted to a number of units of voice-grade circuits required to supply the service demanded. Armed with this information, along with the number of periods within a selected time interval under review, the user may thereafter determine the demand between service nodes in units of DS3.

Figure 8:
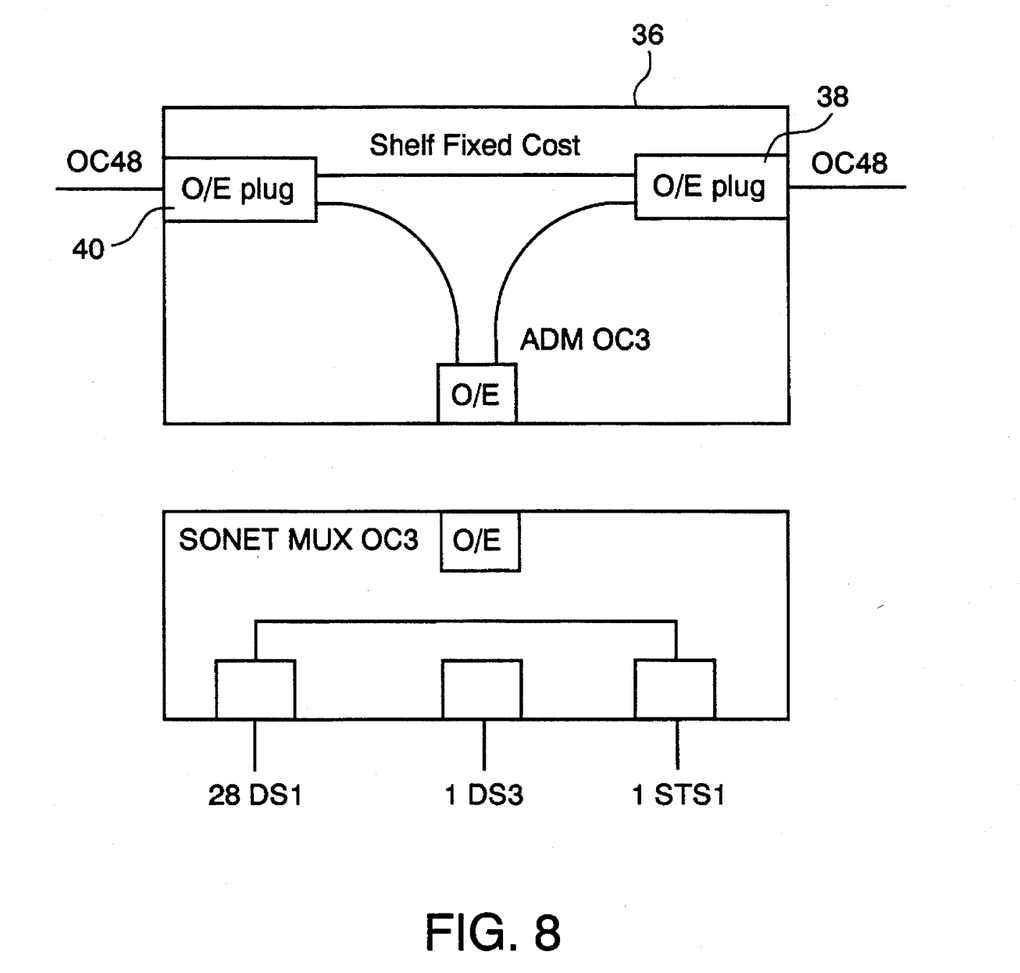
FIG. 8 is a schematic illustration of the major cost components of an ADM.

As those skilled in the art will recognize, circuits added to the communication network will incur two general types of costs. One is an installation cost, and this is incurred only once. The other cost is an operation cost, and it is continuously incurred as long as the circuit is in service. In keeping with the invention, the major cost components of a generic ADM may be graphically described by the diagram of FIG. 8. A shelf 36 and two O/E plugs 38 and 40 are the fixed part of an ADM independent of working capacity. The other components are added based on how much traffic that needs to be added or dropped from the ADM. For the purpose of the method of the present invention, it is necessary to model these costs by dividing the total cost of an ADM into three separate categories: fixed cost, add-drop cost, and interconnection cost. The fixed cost of an ADM is defined herein as the sum of the shelf cost and two O/E plugs cost. The add-drop cost is defined as the total cost of the components that are used to add or drop traffic from the network. Similarly, the interconnection cost is defined as the total cost of the components that are used to make connections with other rings.

Since the total amount of add-drop cost at a switching office is largely determined by the traffic associated therewith, it must be determined as a step in the method of the present invention. Significantly, applicants recognize that to ensure survivability, the connection between two rings has to be made at two distinct locations. As referenced above, two types of connections are possible, i.e. either at the optical level or at the electrical level. However, the cost implications of both connections are different. The optical connection is less expensive but has to be made at OC3 level. On the other hand, the electrical connection is more expensive but usually consumes less ring capacity (equal to the amount of inter-ring traffic).

Figure 9:
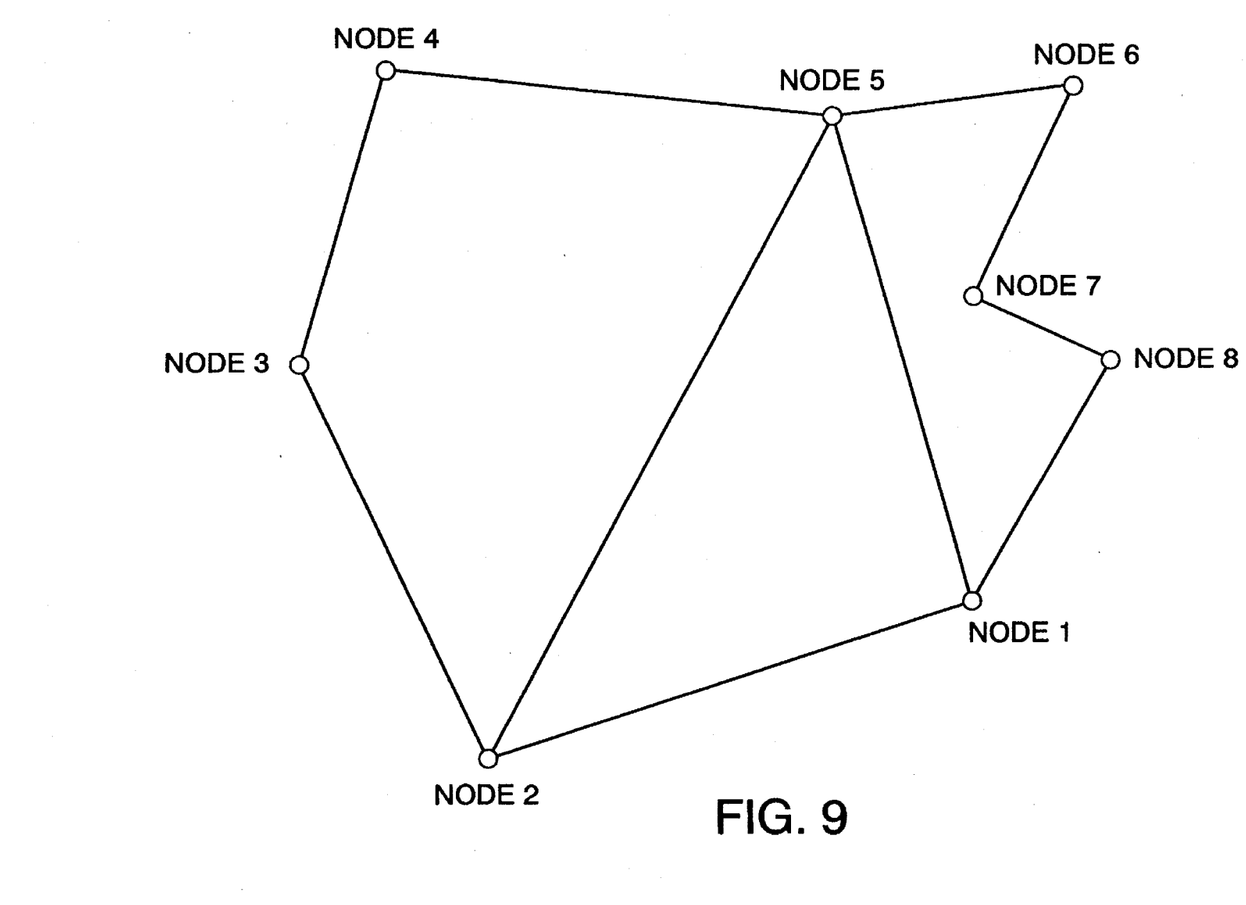
FIG. 9 is a schematic illustration of a representative logical ring design as determined in accordance with the present invention.

In keeping with the invention, once the number of nodes within a selected geographic area and demand therebetween during a selected number of periods has been determined along with the discounted add-drop cost for a plurality of selected add/drop multiplexers, a set of logical rings, i.e. the placement of ADMs within the network may be determined as shown in FIG. 9. Where the geographic area under study is small and the number of nodes is similarly small, this may be accomplished by determining the several discounted fixed and interconnection costs for the ADMs. For example, the user must identify the type, length and location of all existing fiber links between switching offices. In addition, the user must identify by type and location, all existing ADMs and repeaters as well as regeneration costs within the SONET. Once the discounted fixed interconnection costs are determined, they may be optimized in accordance with a first selected mixed integer program such as, for example, that shown below and an electrical signal corresponding thereto may be generated for receipt by an applicable computer memory.

$$\text{Min} \sum_{t=1}^{T} \left[ \sum_{i=1}^{n} \sum_{j=m_{t-1}+1}^{m_t} a_{jt} x_{ij} + \sum_{1 \leq j < r \leq m_t} b_{jrt} h_{jrt} + \sum_{1 \leq j < r \leq m_t} c_{jrt} g_{jrt} \right]$$

subject to $$\sum_{r=1}^{m_t} \sum_{j=1}^{m_t} f_{ikjrt} = d_{ikt} \quad 1 \leq i < k \leq n, d_{ikt} > 0, 1 \leq t \leq T$$

$$\sum_{i<k} (f_{ikjrt} + f_{ikrjt}) - 3h_{jrt} - g_{jrt} \leq 0$$

$$1 \leq j < r \leq m_t, 1 \leq t \leq T$$

$$\sum_{i<k} f_{ikjjt} + \sum_{1 \leq r < j} (3h_{rjt} + g_{rjt}) + \sum_{j \leq r < m_t} (3h_{jrt} + g_{jrt}) \leq C_j$$

$$1 \leq j \leq m_t, 1 \leq t \leq T$$

$$f_{ikjrt} \leq d_{ikt} x_{ij}$$

$$1 \leq i < k \leq n, d_{ikt} > 0, 1 \leq j, r \leq m_t, 1 \leq t \leq T$$

$$f_{ikjrt} \leq d_{ikt} x_{kl}$$

$$1 \leq i < k \leq n, d_{ikt} > 0, 1 \leq j, r \leq m_t, 1 \leq t \leq T$$

$$\sum_{i=1}^{n} x_{ij} \leq S_j \quad 1 \leq j \leq m_T$$

$$x_{ij} = \begin{cases} 1 \text{ if } i \in N_j \\ 0 \text{ otherwise} \end{cases} \quad m_{t-1}+1 \leq j \leq m_{t-1}+l_t, 1 \leq t \leq T$$

$$x_{ij+1} \leq x_{ij} \quad m_{t-1}+l_t+1 \leq j < m_t, 1 \leq t \leq T$$

$$f_{ikjrt} \geq 0$$

$$1 \leq i < k \leq n, d_{ikt} > 0, 1 \leq j, r \leq m_T, 1 \leq t \leq T$$

$$g_{jrt} \geq 0 \quad 1 \leq j, r \leq m_T, 1 \leq t \leq T$$

$$h_{jrt} \in \{0, 1, 2, \ldots\} \quad 1 \leq j, r \leq m_T, 1 \leq t \leq T$$

$$x_{ij} \in \{0, 1\} \quad 1 \leq i \leq n, 1 \leq j \leq m_T$$

wherein, n=number of central offices in the network;
T=number of time periods in the planning horizon;
$d_{ikt}$=demand in units of DS3 between offices i and k in period t;
$a_{jt}$=discounted fixed cost for an ADM of ring j installed in period t;
$B_{jrt}$=discounted optical inter-ring traffic cost between ring j and ring r in period t;
$b_{jrt}=b_{jrt}=B_{jrt}-B_{jr,t+1}$, $1 \leq j < r \leq m_T$;
$C_{jrt}$=discounted electrical inter-ring traffic cost between ring j and ring r in period t;
$c_{jrt}=c_{jrt}=C_{jrt}-C_{jr,t+1}$, $1 \leq j < r \leq m_T$;
$m_t$=maximum number of rings to be installed by time period t;
$l_t$=number of fixed rings to be installed in time period t;
$C_j$=capacity of ring j in units of OC;
$S_j$=maximum size of ring j;
$N_j$=set of offices on fixed ring j;
$f_{ikjrt}$=traffic between offices i and k routed from ring j to ring r in period t; (office i is on ring j, office k is on ring r).
$h_{jrt}$=number of optical OC3 connections between ring j and ring r in period t;
$g_{jrt}$=electrical inter-ring traffic routed from ring j to ring r in period t;
$x_{ij}=x_{ij}=1$ if office i is on ring j; $x_{ij}=0$ otherwise. and
(i) discounted fixed cost for an ADM of ring j in period t:
$a_{jt}$=[Shelf+20/E plug+(ADM OC3+MUX OC3+Equiv Elec drop)/2]·$e_t$;
(ii) discounted optical inter-ring traffic cost per OC3 between ring j and ring r in period t:
$B_{jrt}$=[2 ADM OC3 of ring j+2 ADM OC3 of ring r]·$e_t$;
(iii) discounted electrical inter-ring traffic cost per DS3 between ring j and ring r in period t:
$C_{jrt}$=[2 (ADM OC3+MUX OCS+Equiv Elec drop) of ring j+2 (ADM OC3+ MUX OC3+Equiv Elec drop) of ring r]·$e_t$/3;
wherein $e_t=(1+\alpha)^{-t}$, and $\alpha$ is the annual discount rate.

In keeping with the invention, the above mixed integer program may be implemented in an appropriate language such as "C" on a SUNSPARC station and the resulting logical ring and preliminary routing information may be retrieved from memory and graphically illustrated on a user-friendly interface.

In situations where a larger geographic area having a greater number of nodes is being analyzed, the determination of logical rings must be accomplished through a heuristic solution procedure in accordance with the present invention and as explained in further detail below.

In operation, the heuristic logical ring designing approach of the present invention will generate and evaluate a substantial number of meaningful ring network expansion plans and identify a potentially good one for further improvement.

An expansion plan is a sequence of proposed ring networks, one for each time period, such that each network in the sequence (other than the first one) is either the same as its predecessor or is derived from its predecessor by the addition of one or more proposed rings to satisfy the demand growth. Each expansion plan may be evaluated by its discounted total cost associated with equipment expenditure.

Proposed ring network expansion plans are generated automatically in the following fashion: starting with an empty network and time period zero, the present invention uses a ring generating iteration to extend each network in time period t to several feasible networks in time period t+1. Typically, the demand matrix for time period t+1, t+2 . . . , T are used to generate these new networks in period t+1. Thus, in total, $2^T$ expansion plans will be generated and evaluated.

The ring generation portion of the present invention may be described as follows. At the outset, traffic must be loaded to existing fixed rings in order to account for existing capacity. Thus, the smallest point-to-point demand must be identified whose two end offices are on a single existing ring. Thereafter, the demand must be assigned to the ring subject to the ring capacity constraint. This procedure is repeated until no demand left can be routed. Thereafter, a fictitious network of central offices must be constructed by adding a link between two offices if there is currently fiber running between them or if the demand between them is greater than the length addition threshold.

A proposed ring may then be created by identifying the greatest unsatisfied point-to-point demand between two adjacent nodes and assigning those nodes to a ring. At that point, the user may randomly generate new proposed rings until all demand has been satisfied or, in the alternative, randomly expand existing proposed rings until all demand has been satisfied. The latter step requires three substeps: (1) ring selection, (2) fixing ring capacity, and (3) node selection.

For ring selection, the planner must define a node to be a neighbor of a ring if it is adjacent to two or more nodes in the ring. (If the ring contains only two nodes, then any node connected to either one of them is also counted as a neighbor of the ring.) For each proposed ring, the largest unsatisfied demand of its neighbors to the ring must be determined. The smaller of this number and the unassigned capacity limit of the ring is thus defined as the ring's deficit. Once the deficit has been defined, the planner must identify the three rings with the greatest deficits (breaking ties arbitrarily) and randomly choosing one of them with equal probability as the next ring to expand. Significantly, if fewer then three rings have non-zero deficits, the planner may randomly select one of them with equal probability as the next ring to expand.

Once ring selection has been completed, the ring capacity must be fixed. In keeping with the invention, if no ring has a positive deficit, then the capacity of each proposed ring will be fixed at the high level if the traffic load on the ring is above the capacity fill level. In contrast, if the traffic load is below the capacity fill level, then the capacity of that ring will be fixed at the low level. Thereafter, the planner must identify the three neighbors of the selected ring that have the greatest unsatisfied demand. The ring may thereafter be expanded by randomly choosing one of these three neighbors with equal probability and adding it to the selected ring.

Once the proposed rings have been fully generated, inter-ring traffic must be assigned in order to preliminarily identify a logical ring design and traffic routing. Thus, the planner must identify a demand that can be routed for several existing rings with a longest path of minimum number of rings. This demand is routed through the rings on the path subject to the ring capacity constraints. This process is iterative in nature and is continued until no demand left can be routed. In operation, if no demand remains, the planner may return the current assignment of nodes to proposed rings and the proposed SONET ring network developed through this method. Otherwise, all nodes that are adjacent to a ring must be included as its current neighbors and further ring expansion must be implemented. In this approach, like the simplified approach above, logical ring and preliminary routing information may also be retrieved from memory and graphically illustrated on a user-friendly interface.

Figure 10:
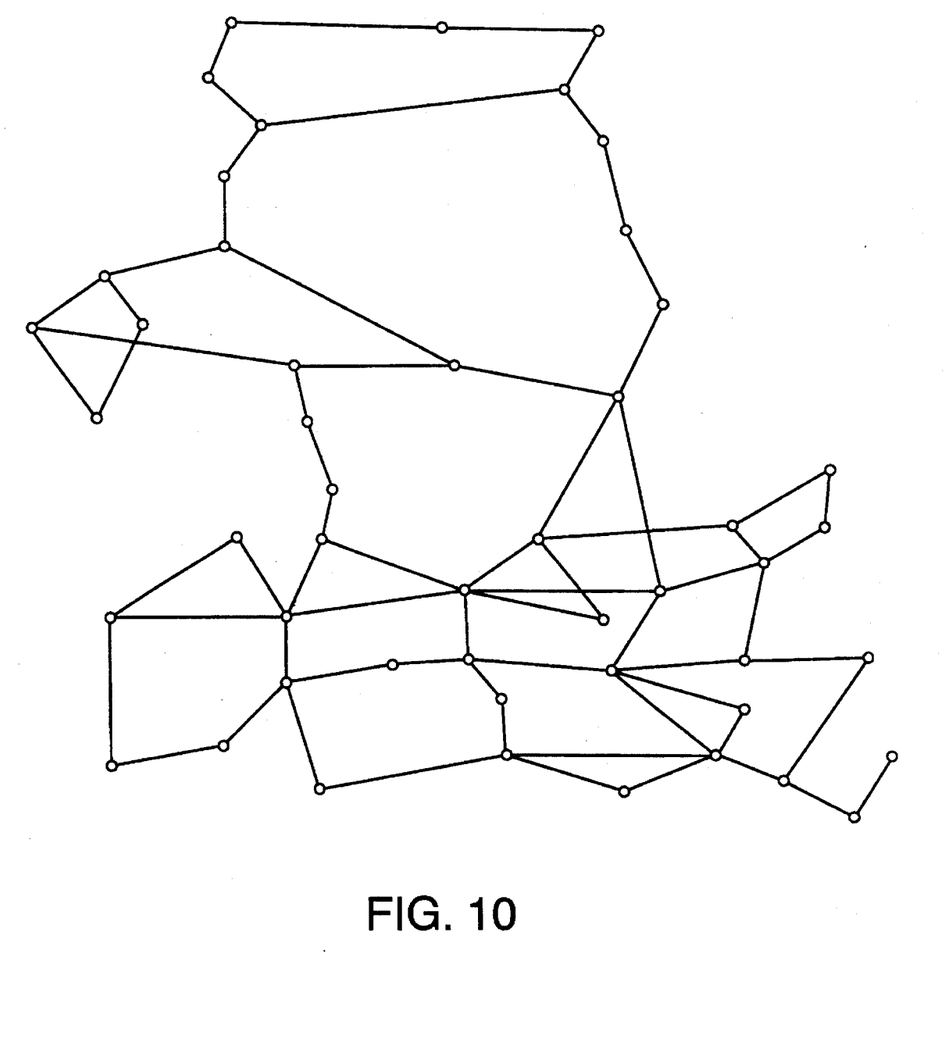
FIG. 10 is a schematic illustration of a representative physical ring design as determined in accordance with the present invention.

At this point, in both the simplified and heuristic approaches, the user may then efficiently determine the placement of physical self-healing rings as shown, for example, in FIG. 10. The user may also determine the optimal traffic routing between and among the physical rings by maximizing the percentage of demand covered and minimizing the total inter-ring traffic cost. This is accomplished by retrieving from memory the logical SHR and preliminary routing information and utilizing a second selected mixed integer program such as referenced below and generating an electrical signal corresponding thereto for receipt by said memory. Again, this program may be implemented in C on a SUNSPARC station and stored in appropriate memory.

$$\text{Max } rz - \sum_{j<r} b_{jr} h_{jr} - \sum_{j<r} c_{jr} g_{jr}$$

subject to $$\sum_{j:i \in R_j} \sum_{r: k \in R_r} f_{ikjr} - d_{ik} z = 0 \quad 1 \leq i < k \leq n, d_{ik} > 0$$

$$\sum_{i<k} (f_{ikjr} + f_{ikrj}) - 3h_{jr} - g_{jr} \leq 0 \quad j, r \in J, jr$$

$$\sum_{i<k} f_{ikjj} + \sum_{r<j} (3h_{rj} + g_{rj}) + \sum_{r>j} (3h_{jr} + g_{jr}) \leq C_j j \in J$$

$$0 \leq z \leq 1$$

$$f_{ikrj} \geq 0 \quad 1 \leq i < k \leq n, d_{ik} > 0, j, r \in J, i \in R_j, k \in R_r$$

$$g_{jr} \geq 0 \quad j, r \in J, j < r, |R_j \cap R_r| \geq 2$$

$$h_{jr} \in \{0, 1, 2, \ldots\} \quad j, r \in J, j < r$$

where, $d_{ik}$: demand between offices i and k, i<k;

J: index set of fixed rings;

$R_j$: set of offices on ring j, j ∈ J;

$b_{jr}$: optical OC3 inter-ring traffic cost between rings r and r,j<r;

$c_{jr}$: electrical inter-ring traffic cost between rings j and r,j<r, $|R_j \cap R_r| \geq 2$;

$C_j$: capacity of ring j, j ∈ J;

r: r=2|J|max{$b_{jr}$+$c_{jr}$} $\Sigma d_{ik}$;

z: fraction of total demand being covered;

$f_{ikjr}$: traffic between offices i and k routed from ring j to ring r (i is on ring j, k on ring r);

$h_{jr}$: number of optical OC3 connections between rings j and r;

$g_{jr}$: electrical inter-ring traffic routed form ring j to ring r.

It should be noted that the first four constraints referenced above are flow balance constraints which ensure all demand is covered. The fifth constraint is called capacity constraint which sets a limit on the amount of traffic to be carried by each ring. Again, this information, i.e. physical ring and optimal routing information, may also be retrieved from memory and graphically displayed on a user-friendly interface.

Figure 11:
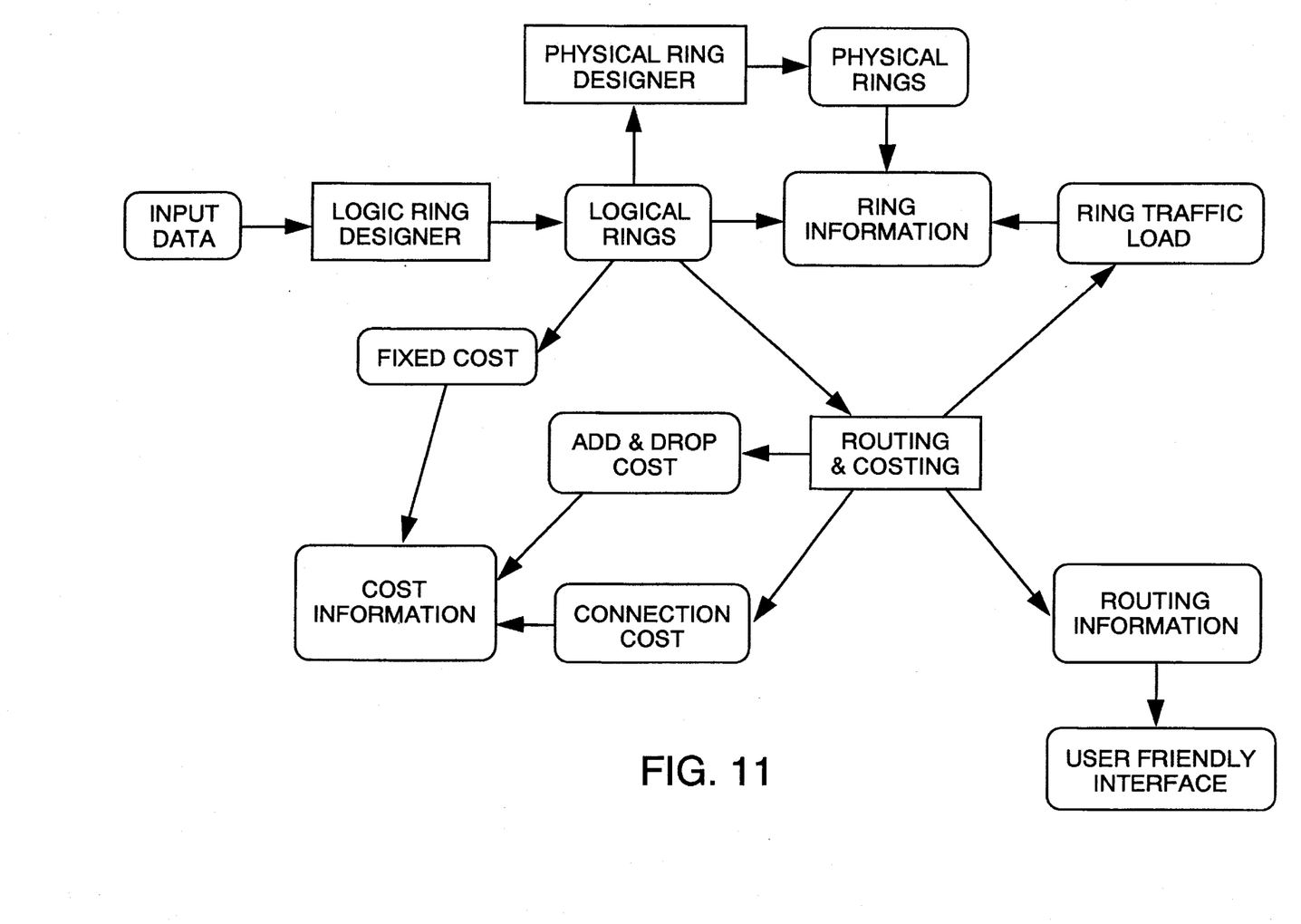
FIG. 11 is a flow diagram illustrating the steps involved in the method of the present invention.

In operation, the user may also specify the elapsed time and type of analysis in order to limit the number of iterations. For example, the user may specify that a 5 year solution be implemented in year 1. In the alternative, the user may specify that a solution be determined only for year 1, then expand the solution for each year until year 5. Still further, the user may specify that a solution be determined based upon 2 year demand—implemented in year 1—and expand for years 3–5. If no limits on the type of analysis are provided, the system will run all feasible solutions. The user may thus prescribe the elapsed analysis time in order to limit the number of iterations and the attendant analysis. The planning procedure referenced herein is also graphically illustrated by the flow diagram of FIG. 11.

While the best modes for carrying out the invention have been described in detail, those familiar with the art to which this invention relates will recognize various alternative designs and embodiments for practicing the invention as defined by the following claims.

What is claimed is:

1. For use in cooperation with a computer having memory, a method of placing Self-Healing Rings (SHRs) in a Synchronous Optical Network (SONET) and routing point-to-point demand in accordance with projected customer demand over a selected multi-period time interval, comprising:

determining a number of nodes within the SONET;

identifying a number of periods within the selected multi-period time interval;

determining the projected customer demand between said nodes over said selected multi-period time interval;

determining a discounted add-drop cost for a plurality of selected Add/Drop Multiplexers (ADMs);

determining optimized discounted fixed and interconnection costs for said plurality of ADMs in accordance with a first selected mixed integer program;

determining a set of logical SHRs and corresponding preliminary routing plans;

storing in the memory of the computer logical SHR data and preliminary routing data corresponding to said set of logical SHRs and corresponding preliminary routing plans;

determining from said logical SHR data and preliminary routing data the optimized placement of physical SHRs, optimized cash flow out and optimal traffic routing in accordance with a second selected mixed integer program;

storing in the memory of the computer optimized placement data of physical SHRs, optimized cash flow data and optimal traffic routing data corresponding to the determined optimized placement of the physical SHRs, determined optimized cash flow and said determined optimal traffic routing; and placing said SHRs in said SONET in accordance with said optimized SHR placement data, said optimized cash flow out data and said optimized traffic routing data.

2. The method of claim 1, wherein said first mixed integer program may be expressed as:

$$\text{Min} \sum_{t=1}^{T} \left[ \sum_{i=1}^{n} \sum_{j=m_{t-1}+1}^{m_t} a_{jt} x_{ij} + \sum_{1 \leq j < r \leq m_t} b_{jrt} h_{jrt} + \sum_{1 \leq j < r \leq m_t} c_{jrt} g_{jrt} \right]$$

to subject $$\sum_{r=1}^{m_t} \sum_{j=1}^{m_t} f_{ikjrt} = d_{ikt} \quad 1 \leq i < k \leq n, \, d_{ikt} > 0, \, 1 \leq t \leq T$$

$$\sum_{i<k} (f_{ikjrt} + f_{ikrjt}) - 3h_{jrt} - g_{jrt} \leq 0$$

$$1 \leq j < r \leq m_t, \, 1 \leq t \leq T$$

$$\sum_{i<k} f_{ikjjt} + \sum_{1 \leq r<j} (3h_{rjt} + g_{rjt}) + \sum_{j \leq r < m_t} (3h_{jrt} + g_{jrt}) \leq C_j$$

$$1 \leq j \leq m_t, \, 1 \leq t \leq T$$

$$f_{ikjrt} \leq d_{ikt} x_{ij}$$

$$1 \leq i < k \leq n, \, d_{ikt} > 0, \, 1 \leq j, r \leq m_t, \, 1 \leq t \leq T$$

$$f_{ikjrt} \leq d_{ikt} x_{kl}$$

$$1 \leq i < k \leq n, \, d_{ikt} > 0, \, 1 \leq j, r \leq m_t, \, 1 \leq t \leq T$$

$$\sum_{i=1}^{n} x_{ij} \leq S_j \quad 1 \leq j \leq m_T$$

$$x_{ij} = \begin{cases} 1 \text{ if } i \in N_j \\ 0 \text{ otherwise} \end{cases} \quad m_{t-1}+1 \leq j \leq m_{t-1}+l_t, \, 1 \leq t \leq T$$

$$x_{1j+1} \leq x_{1j} \quad m_{t-1}+l_t+1 \leq j < m_t, \, 1 \leq t \leq T$$

$$f_{ikjrt} \geq 0$$

$$1 \leq i < k \leq n, \, d_{ikt} > 0, \, 1 \leq j, r \leq m_T, \, 1 \leq t \leq T$$

$$g_{jrt} \geq 0 \quad 1 \leq j, r \leq m_T, \, 1 \leq t \leq T$$

$$h_{jrt} \in \{0, 1, 2, \ldots\} \quad 1 \leq j, r \leq m_T, \, 1 \leq t \leq T$$

$$x_{ij} \in \{0, 1\} \quad 1 \leq i \leq n, \, 1 \leq j \leq m_T$$

wherein, n=number of central offices in the network;

T=number of time periods in the planning horizon;

$d_{ikt}$=demand in units of DS3 between offices i and k in period t;

$a_{jt}$=discounted fixed cost for an ADM of ring j installed in period t;

$B_{jrt}$=discounted optical inter-ring traffic cost between ring j and ring r in period t;

$b_{jrt}=b_{jrt}=B_{jrt}-B_{jr,t+1}, \, 1 \leq j < r \leq m_T$;

$C_{jrt}$=discounted electrical inter-ring traffic cost between ring j and ring r in period t;

$c_{jrt}=c_{jrt}=C_{jrt}-C_{jr,t+1}, \, 1 \leq j < r \leq m_T$;

$m_t$=maximum number of rings to be installed by time period t;

$l_t$=number of fixed rings to be installed in time period t;

$C_j$=capacity of ring j in units of OC;

$S_j$=maximum size of ring j;

$N_j$=set of offices on fixed ring j;

$f_{ikjrt}$=traffic between offices i and k routed from ring j to ring r in period t; (office i is on ring j, office k is on ring r).

$h_{jrt}$=number of optical OC3 connections between ring j and ring r in period t;

$g_{jrt}$=electrical inter-ring traffic routed from ring j to ring r in period t;

$x_{ij}=x_{ij}=1$ if office i is on ring j; $x_{ij}=0$ otherwise. and (i) discounted fixed cost for an ADM of ring j in period t: $a_{jt}$=[Shelf+20/E plug+(ADM OC3+MUX OC3+ Equiv Elec drop)/2]·$e_t$;

(ii) discounted optical inter-ring traffic cost per OC3 between ring j and ring r in period t:

$B_{jrt}$=[2 ADM OC3 of ring j+2 ADM OC3 of ring r]·$e_t$;

(iii) discounted electrical inter-ring traffic cost per DS3 between ring j and ring r in period t:

$C_{jrt}$=[2 (ADM OC3+MUX OCS+Equiv Elec drop) of ring j+2 (ADM OC3+ MUX OC3+Equiv Elec drop) of ring r]·$e_t$/3;

wherein $e_t$=$(1+\alpha)^{-t}$, and $\alpha$ is the annual discount rate.

3. The method of claim 1, wherein said second mixed integer program may be expressed as:

$$\text{Max } rz - \sum_{j<r} b_{jr} h_{jr} - \sum_{j<r} c_{jr} g_{jr}$$

subject to $$\sum_{j:i \in R_j} \sum_{r:k \in R_r} f_{ikjr} - d_{ik} z = 0 \quad 1 \leq i < k \leq n, d_{ik} > 0$$

$$\sum_{i<k} (f_{ikjr} + f_{ikrj}) - 3h_{jr} - g_{jr} \leq 0 \quad j, r \in J, jr$$

$$\sum_{i<k} f_{ikjj} + \sum_{r<j} (3h_{rj} + g_{rj}) + \sum_{r>j} (3h_{jr} + g_{jr}) \leq C_j j \in J$$

$$0 \leq z \leq 1$$

$$f_{ikrj} \geq 0 \quad 1 \leq i < k \leq n, d_{ik} > 0, j, r \in J, i \in R_j, k \in R_r$$

$$g_{jr} \geq 0 \quad j, r \in J, j < r, |R_j \cap R_r| \geq 2$$

$$h_{jr} \in \{0, 1, 2, \ldots\} \quad j, r \in J, j < r$$

where, $d_{ik}$: demand between offices i and k, i<k;

J: index set of fixed rings;

$R_j$: set of offices on ring j, j ∈ J;

$b_{jr}$: optical OC3 inter-ring traffic cost between rings r and r, j<r;

$c_{jr}$: electrical inter-ring traffic cost between rings j and r, j<r, $|R_j \cap R_r| \geq 2$;

$C_j$: capacity of ring j, j ∈ J;

r: r=2|J|max{$b_{jr}$+$c_{jr}$} $\Sigma d_{ik}$;

z: fraction of total demand being covered;

$f_{ikjr}$: traffic between offices i and k routed from ring j to ring r (i is on ring j, k on ring r);

$h_{jr}$: number of optical OC3 connections between rings j and r;

$g_{jr}$: electrical inter-ring traffic routed form ring j to ring r.

4. The method of claim 1, further comprising converting said logical SHR data and preliminary routing data to graphic data; and displaying said graphic data on a user-friendly interface.

5. For use in cooperation with a computer having memory, a system for placing Self-Healing Rings (SHRs) in a Synchronous Optical Network (SONET) and routing point-to-point demand in accordance with projected customer demand over a selected multi-period time interval, comprising:

means for determining a number of nodes within the SONET;

means for identifying a number of periods within the selected multi-period time interval;

means for determining the projected customer demand between said nodes over said selected multi-period time interval;

means for determining a discounted add-drop cost for a plurality of Add/Drop Multiplexers (ADMs);

means for determining optimized discounted fixed and interconnection costs for said plurality of selected ADMs in accordance with a first selected mixed integer program;

means for determining a set of logical SHRs and corresponding preliminary routing plans;

means for storing in the memory of the computer logical SHR data and preliminary routing data corresponding to said set of logical SHRs and corresponding preliminary routing plans;

means for determining from said logical SHR data and preliminary routing data the optimized placement of physical SHRs, optimized cash flow out and optimal traffic routing in accordance with a second selected mixed integer program;

means for storing in the memory of the computer optimized placement data of physical SHRs, optimized cash flow data and optimal traffic routing data corresponding to the determined optimized placement of the physical SHRs, the determined optimized cash flow and said determined optimal traffic routing such that said SHRs may be placed in the SONET in accordance therewith.

6. The system of claim 5, further comprising means for converting said logical SHR data and preliminary routing data to graphic data; and means for displaying said graphic data on a user-friendly interface.

7. For use in cooperation with a computer having memory, a method of placing Self-Healing Rings (SHRs) in a Synchronous Optical Network (SONET) and routing point-to-point demand in accordance with projected customer demand over a selected multi-period time interval, comprising:

determining a number of nodes within the SONET;

identifying a number of periods within the selected multi-period time interval;

determining demand between said nodes during each of said multi-period time intervals;

determining a discounted add-drop cost for a plurality of selected Add/Drop Multiplexers (ADMs);

loading traffic to existing rings by repetitively identifying a smallest point-to-point demand between nodes on said existing rings and assigning said demand to said rings until no demand left can be routed;

creating a proposed ring by identifying a greatest unsatisfied point-to-point demand between two adjacent nodes and assigning said nodes to said rings;

randomly creating additional proposed rings until all demand has been satisfied;

randomly expanding said created rings until all demand has been satisfied by: (a) repetitively determining a largest unsatisfied demand of neighbor nodes for each of said created rings, (b) identifying a plurality of said neighbor nodes having the greatest unsatisfied demand, (c) determining a deficit of each of said created rings, (d) identifying a plurality of said created rings with the greatest deficit, and (e) randomly selecting for expansion one of said plurality of created rings and one of said plurality of neighbor nodes and assigning the same to one another;

loading inter-ring traffic to said created rings until all demand has been routed by repetitively identifying demand that can be routed the greatest distance through the smallest number of said created rings and assigning said demand accordingly so as to determine a set of logical SHRs and preliminary routing plans;

storing in the memory of the computer logical SHR data and preliminary routing data corresponding to said set of logical SHRs and corresponding preliminary routing plans;

determining from said logical SHR data and preliminary routing data the optimized placement of physical SHRs, optimized cash flow out and optimal traffic routing in accordance with a second selected mixed integer program;

storing in the memory of the computer optimized placement data of physical SHRs, optimized cash flow data and optimal traffic routing data corresponding to the determined optimized placement of the physical SHRs, the determined optimized cash flow and said determined optimal traffic routing; and placing said SHRs in said SONET in accordance with said optimized SHR placement data, said optimized cash flow out data and said optimal traffic routing data.

8. The method of claim 7, wherein said selected mixed integer program may be expressed as:

$$\text{Max } rz - \sum_{j<r} b_{jr}h_{jr} - \sum_{j<r} c_{jr}g_{jr}$$

subject to $$\sum_{j:i \in R_j} \sum_{r:k \in R_r} f_{ikjr} - d_{ik}z = 0 \quad 1 \leq i < k \leq n, d_{ik} > 0$$

$$\sum_{i<k} (f_{ikjr} + f_{ikrj}) - 3h_{jr} - g_{jr} \leq 0 \quad j, r \in J, jr$$

$$\sum_{i<k} f_{ikjj} + \sum_{r<j} (3h_{rj} + g_{rj}) + \sum_{r>j} (3h_{jr} + g_{jr}) \leq C_j j \in J$$

$$0 \leq z \leq 1$$

$$f_{ikrj} \geq 0 \quad 1 \leq i < k \leq n, d_{ik} > 0, j, r \in J, i \in R_j, k \in R_r$$

$$g_{jr} \geq 0 \quad j, r \in J, j < r, |R_j \cap R_r| \geq 2$$

$$h_{jr} \in \{0, 1, 2, \ldots\} \quad j, r \in J, j < r$$

where, $d_{ik}$: demand between offices i and k, i<k;

J: index set of fixed rings;

$R_j$: set of offices on ring j, j ∈ J;

$b_{jr}$: optical OC3 inter-ring traffic cost between rings r and r, j<r;

$c_{jr}$: electrical inter-ring traffic cost between rings j and r, j<r, $|R_j \cap R_r| \geq 2$;

$C_j$: capacity of ring j, j ∈ J;

r: r=2|J|max$\{b_{jr}+c_{jr}\}$ $\Sigma d_{ik}$;

z: fraction of total demand being covered;

$f_{ikjr}$: traffic between offices i and k routed from ring j to ring r $g_{jr}$: pelectrical inter-ring traffic routed form ring j to ring r.

9. The method of claim 7, further comprising converting said logical SHR data and preliminary routing data to graphic data; and displaying said graphic data on a user-friendly interface.

10. For use in cooperation with a computer having memory, a system for placing Self-Healing Rings (SHRs) in a Synchronous Optical Network (SONET) and routing point-to-point demand in accordance with projected customer demand over a selected multi-period time interval, comprising:

means for determining a number of nodes within the SONET;

means for identifying a number of periods within the selected multi-period time interval;

means for determining the projected customer demand between said nodes over said selected multi-period time interval;

means for determining a discounted add-drop cost for a plurality of Add/Drop Multiplexers (ADMs);

means for determining optimized discounted fixed and interconnection costs for said plurality of selected ADMs in accordance with a first selected mixed integer program;

means for determining a set of logical SHRs and corresponding preliminary routing plans;

means for storing in the memory of the computer logical SHR data and preliminary routing data corresponding to said set of logical SHRs and corresponding preliminary routing plans;

means for determining from said logical SHR data and preliminary routing data the optimized placement of physical SHRs, optimized cash flow out and optimal traffic routing in accordance with a second selected mixed integer program;

means for storing in the memory of the computer optimized placement data of physical SHRs, optimized cash flow data and optimal traffic routing data corresponding to the determined optimized placement of the physical SHRs, the determined optimized cash flow and said determined optimal traffic routing such that said SHRs may be placed in the SONET in accordance therewith.

11. The system of claim 10, further comprising means for converting said logical SHR data and preliminary routing data to graphic data; and means for displaying said graphic data on a user-friendly interface.

* * * * *